(12) United States Patent
MacKinnon et al.

(10) Patent No.: US 8,337,188 B2
(45) Date of Patent: Dec. 25, 2012

(54) APPARATUS FOR MAKING A SHINGLE, AND SHINGLE MADE THEREBY

(75) Inventors: Thomas Kevin MacKinnon, Daniel Island, SC (US); Robert E. Dodd, Parma, MI (US); Joong Youn Kim, Newtown Square, PA (US); Douglas H. Wylie, Richmond Hill (CA)

(73) Assignee: CertainTeed Corporation, Valley Forge, PA (US)

( * ) Notice: Subject to any disclaimer, the term of this patent is extended or adjusted under 35 U.S.C. 154(b) by 385 days.

(21) Appl. No.: 12/718,351

(22) Filed: Mar. 5, 2010

(65) Prior Publication Data
US 2010/0159053 A1 Jun. 24, 2010

Related U.S. Application Data

(60) Division of application No. 11/227,009, filed on Sep. 15, 2005, now Pat. No. 7,785,510, which is a continuation-in-part of application No. 10/452,059, filed on Jun. 2, 2003, now abandoned.

(51) Int. Cl.
*B29C 47/00* (2006.01)
*B29C 51/02* (2006.01)
*B29C 47/06* (2006.01)
*B29C 45/73* (2006.01)
*D01D 5/12* (2006.01)

(52) U.S. Cl. ............ 425/131.1; 425/112; 425/253; 425/308; 264/148; 264/151; 264/160; 264/173.15; 264/173.16; 264/177.17; 264/210.2; 264/210.5; 264/211.12; 264/294; 264/297.5; 264/320; 264/321; 264/327; 52/540

(58) Field of Classification Search .............. None
See application file for complete search history.

(56) References Cited

U.S. PATENT DOCUMENTS

| | | | |
|---|---|---|---|
| 2,168,218 A | 8/1939 | Kirschbraun | |
| 3,669,918 A | 6/1972 | Raley, Jr. | |
| 3,741,856 A | 6/1973 | Hurst et al. | |
| 3,844,701 A | 10/1974 | Rockwell | |
| 3,900,102 A | 8/1975 | Hurst | |
| 4,220,681 A | 9/1980 | Narita | |
| 4,238,266 A | 12/1980 | Steinberg et al. | |
| 4,332,703 A | 6/1982 | Lijzenga et al. | |
| 4,396,665 A | 8/1983 | Rowe | |
| 4,404,960 A | 9/1983 | Laing | |
| 4,436,685 A * | 3/1984 | Emura et al. | 264/148 |
| 4,671,040 A | 6/1987 | Braithwaite, Jr. | |
| 4,856,975 A | 8/1989 | Gearhart | |
| 4,983,247 A | 1/1991 | Kim | |
| 5,022,381 A | 6/1991 | Allegro | |
| 5,185,117 A * | 2/1993 | Hawley | 264/211.12 |
| 5,202,071 A * | 4/1993 | Nakamura et al. | 264/137 |
| 5,217,655 A | 6/1993 | Schmidt | |
| 5,290,355 A * | 3/1994 | Jakel | 106/675 |
| 5,306,548 A | 4/1994 | Zabrocki et al. | |
| 5,318,737 A | 6/1994 | Trabert et al. | |

(Continued)

*Primary Examiner* — Jeffrey Wollschlager
(74) *Attorney, Agent, or Firm* — Paul & Paul (57) ABSTRACT

An apparatus for making a shingle, together with the shingle made thereby, is provided, in which one or more thermoplastic materials are extruded or co-extruded to form an extrudate, with the extrudate being cut into a preliminary shingle shape, which is allowed to dissipate heat, and then is delivered to a compression mold, wherein the preliminary shingle shape is compression molded to substantially its final dimensions and is then discharged from the mold and allowed to cool.

19 Claims, 9 Drawing Sheets

U.S. PATENT DOCUMENTS

| | | | |
|---|---|---|---|
| 5,401,154 A * | 3/1995 | Sargent | 425/114 |
| 5,415,921 A | 5/1995 | Grohman | |
| 5,482,667 A | 1/1996 | Dunton et al. | |
| 5,571,581 A | 11/1996 | Koizumi et al. | |
| 5,615,523 A | 4/1997 | Wells et al. | |
| 5,630,305 A | 5/1997 | Hlasnicek | |
| 5,759,594 A | 6/1998 | Masui et al. | |
| 5,976,441 A * | 11/1999 | Guyot et al. | 264/210.6 |
| 6,112,492 A | 9/2000 | Wells et al. | |
| 6,303,224 B1 | 10/2001 | Krahn et al. | |
| 6,349,961 B1 | 2/2002 | Colley et al. | |
| 6,368,093 B1 | 4/2002 | Vecchiarino et al. | |
| 6,440,524 B2 | 8/2002 | Valyi et al. | |
| 6,536,177 B1 | 3/2003 | Italiane et al. | |
| 6,861,020 B2 * | 3/2005 | Hashiba | 264/46.4 |
| 7,524,447 B2 * | 4/2009 | Asthana et al. | 264/173.12 |
| 2001/0049918 A1 | 12/2001 | Gilbert et al. | |
| 2003/0054148 A1 | 3/2003 | Jolitz | |
| 2004/0001938 A1 | 1/2004 | Meyer et al. | |
| 2004/0148874 A1 | 8/2004 | Jolitz et al. | |
| 2004/0148895 A1 | 8/2004 | Jolitz et al. | |
| 2004/0177596 A1 | 9/2004 | Jolitz et al. | |
| 2004/0178532 A1 | 9/2004 | Jolitz et al. | |
| 2004/0241476 A1 | 12/2004 | Friedman et al. | |
| 2005/0086907 A1 | 4/2005 | Jolitz | |

\* cited by examiner

APPARATUS FOR MAKING A SHINGLE, AND SHINGLE MADE THEREBY

CROSS-REFERENCE TO RELATED APPLICATIONS

This application is a division of U.S. patent application Ser. No. 11/227,009 filed Sep. 15, 2005, which, in turn, is a continuation-in-part of U.S. patent application Ser. No. 10/452,059, filed Jun. 2, 2003, the complete disclosures of which are herein incorporated by reference.

BACKGROUND OF THE INVENTION

In the art of making roofing shingles and tiles for exterior application in the building industry, various approaches have been made toward making shingles and tiles that are manufactured, but give the appearance of being made of traditional natural materials, such as wood cedar shakes, tiles, slate, etc.

In many instances, such shingles and tiles are made of bitumen coated mat having granules on the exterior surface, with the granules being provided in various designs, shades, color configurations, etc., to yield various aesthetic effects.

It is also known, in making roofing shingles and tiles, to mold them to the desired shape by various molding techniques. The materials that are used in such molding techniques usually include inexpensive filler material, in order to achieve low production costs.

Some such filler materials can be various waste products, such as carbon black, recycled rubber and tire crumb, coal fines, pulp and paper waste and other inexpensive materials.

Such products are often made by molding multi-component formulations, which comprise blends of virgin and recycled polymers and various low-cost fillers.

The use of large quantities of such fillers reduces the mechanical properties of the ultimate product, however. Additionally, the use of large quantities of fillers limits the color variations that are possible in the products and makes the processing of the formulations into shingles and tiles very difficult.

Typically, roofing shingles and tiles made of such material having waste for filler do not provide good weather resistance for the products. Additionally, the warranty periods that can reasonably be provided for such products tend to be short in duration.

Furthermore, such building industry roofing products have relatively low impact strength, especially at low temperatures. Insofar as their available colors are concerned, such tend to be limited to the colors gray and black.

Additionally, molding operations tend to be capital intensive, with relatively high manufacturing costs, although molding techniques do provide a high level of definition or dimension control. Also, there is a disadvantage to molding techniques, in general, in that the length of the cycle for injecting material into the mold, molding to the desired shape, and ejecting the shape from the mold is largely a function of the time required to cool the molten thermoplastic material before it can be removed from the mold. However, the temperature of the thermoplastic material must be sufficiently high that it can flow and fill the cavity within the constraints of the material and equipment (i.e. material characteristics, melt pressures, mold clamping pressures, etc.). While modifications can be made to the materials to help the flow characteristics and thereby lower the required melt temperature, and while improvements can be made to the mold to increase heat transfer and removal, cooling remains the longest part of the cycle for these processes. In order to achieve the necessary cooling, the time required causes a lengthening of the manufacturing cycle, which increases the capital costs of investment in molds and machinery for a required output, thereby substantially increasing manufacturing costs.

SUMMARY OF INVENTION

The present invention is directed to a process of making a shingle having a desired configuration, by a combination of extruding and molding, in order to reduce the time required for the molding operation. As used throughout the application, "shingle" should be considered to embrace "tile" also.

It is a further object of this invention to accomplish the above object by co-extruding the shingle to include a core material with a shingle capstock material on a major surface.

It is a further object of this invention to accomplish the above objects, in which the extruding step is a continuous process, and in which the extrudate is serially cut into discrete preliminary shingle shapes, prior to molding those shapes into the final shingle shape.

Additional objects of this invention include producing shingles by the processes described above.

Further objects of this invention include providing apparatus for accomplishing the processes for producing shingles as described above.

Other objects and advantages of the present invention will be readily apparent upon a reading of the following brief descriptions of the drawing figures, detailed descriptions of the preferred embodiments, and the appended claims.

DETAILED DESCRIPTIONS OF THE PREFERRED EMBODIMENTS

Referring now to the drawings in detail, it will be seen that, in accordance with this invention, the shingle or tile will first be pre-shaped by extruding a cross-section that will be generally similar to the finished cross-section of the shingle or tile, with the pre-shaped or preliminary shingle shape then being allowed to cool somewhat prior to placement of it in the mold. By first getting the preliminary shingle shape to conform closely to the final shingle shape before placing it in the mold, long flow distances and hence higher material temperatures are avoided. The material in the mold is then compression molded to achieve its final dimensions. Because significant amounts of heat are removed prior to placement of the preliminary shingle shape into the mold, very short cooling cycles are achieved.

In another embodiment, the amount of cooling is minimized prior to placement in the mold. In this way, significant amounts of heat do not need to be provided, thus the shortened cooling cycle is obtainable. Also, higher molecular weight polymeric materials with higher viscosities and better polymer performance properties, which would not normally be useful in a molding operation such as injection molding, can be used, because the shape of the precursor is close to that of the molded piece and the amount of material flow necessary to produce the desired finished shingle shape is minimal.

Figure 1:
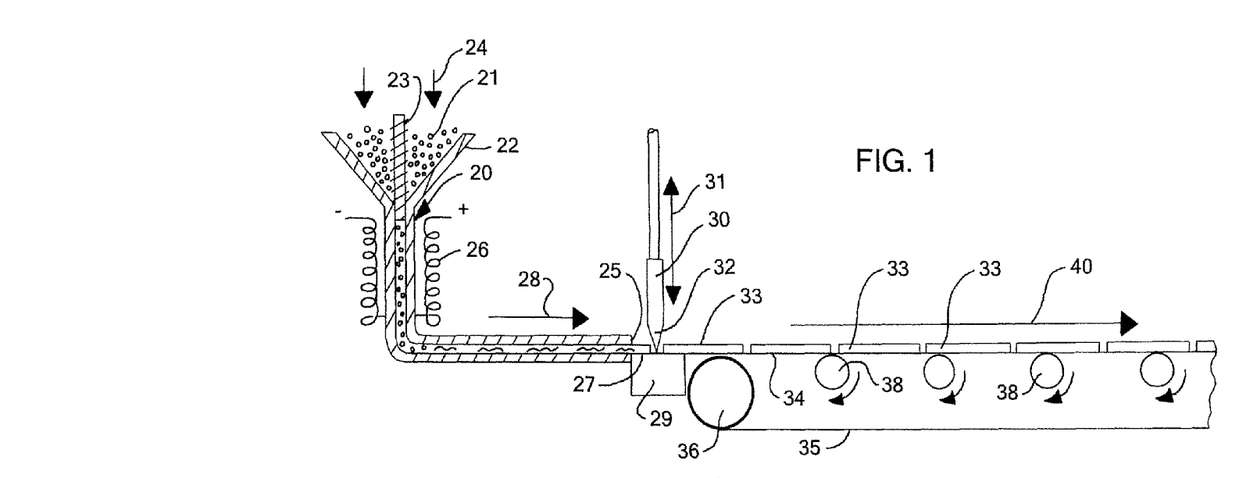
FIG. 1 is a vertical, sectional view of a process and apparatus for extruding a preliminary shingle shape and serially severing the extrudate into a plurality of preliminary shingle shapes, for delivery to a molding station, with the delivery means being fragmentally illustrated at the right end thereof.

Referring now to FIG. 1, it will be seen that an extruder is generally designated by the numeral 20 for receiving generally thermoplastic pellets 21 into an inlet hopper 22 thereof, and with an auger 23 being rotatably driven, to urge the pellets through the extruder 20 in the downward direction of the arrow 24, through the extruder, to be discharged at discharge end 25. It is desirable to dry the pellets prior to adding them to the extruder in some instances, depending on the composition of the pellets. Such drying may include exposing the pellets to a drying cycle of up to 4 hours, at an elevated temperature, such as, for example, 180° F. Suitable means, such as electric coils 26 are provided for heating the thermoplastic material 21 in the extruder, so that the same can be extruded into a desired shape as may be determined by the outlet mouth 25 of the extruder 20. The extrudate 27 is then moved horizontally in the direction of the arrow 28, beneath a transverse cutting mechanism 30 in the form of a guillotine, which is movable upwardly and downwardly in the direction of the double-headed arrow 31, with the blade 32 of the guillotine, operating against an anvil 29, to sever the extrudate 27 into a plurality of preliminary shingle shapes 33. The shapes 33 then pass onto an upper run 34 of a continuously moving conveyor belt 35 driven between idler end roller 36 and motor-driven end roller 37, with the upper run 34 of the belt 35 being supported by suitable idler rollers 38, as the preliminary shingle shapes 33 are delivered rightward, in the direction of the arrow 40 illustrated in FIG. 1. In lieu of a guillotine 30, any other type of cutting mechanism, such as for example only, a blade or other cutter movable transversely across the belt 34, or the die lip at the discharge end 25 of the extruder, in a direction perpendicular to the arrow 40 can be used to separate the extrudate into a plurality of shapes 33. The belt which supports the shapes can be a vented belt made of a suitable material, such as, for example, a silicone coated belt, or a metal mesh belt, or the like, in order to control bubbling or outgassing of gasses from the extrudate, if desired.

Figure 2:
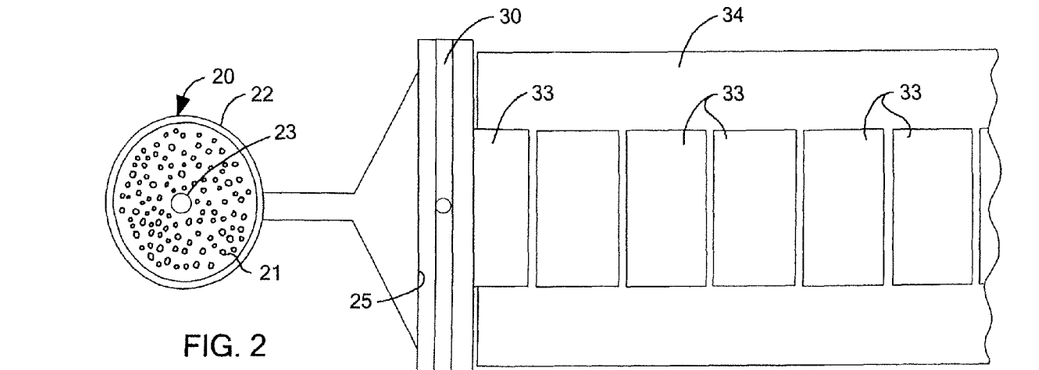
FIG. 2 is a top plan view of that which is illustrated in FIG. 1.

It will be seen that in the embodiment of FIGS. 1 and 2, the preliminary shingle shapes 33 are extruded into a single layer of material from the shingle extruder 20.

Figure 3:
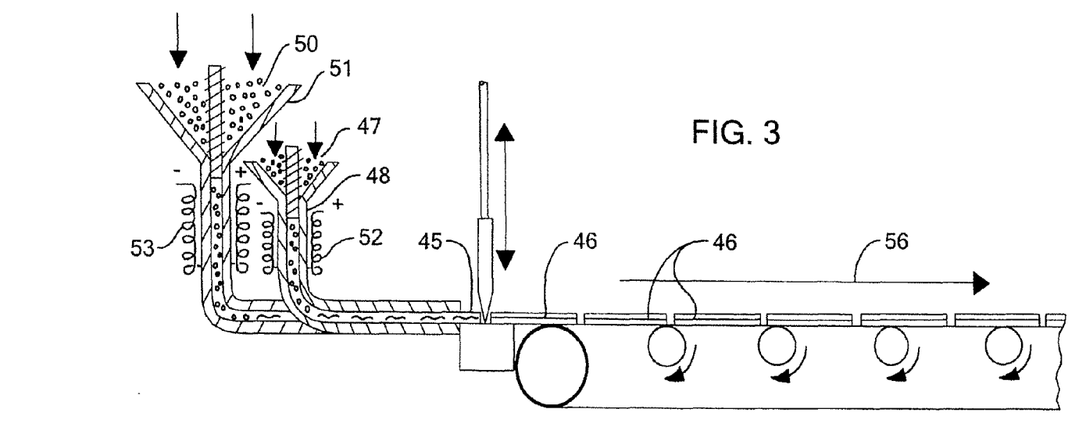
FIG. 3 is an illustration similar to that of FIG. 1, but wherein the extruding operation includes both core material and skin or capstock material, being co-extruded prior to the serial severing step, with the delivery means also being fragmentally illustrated at the right end thereof.
Figure 4:
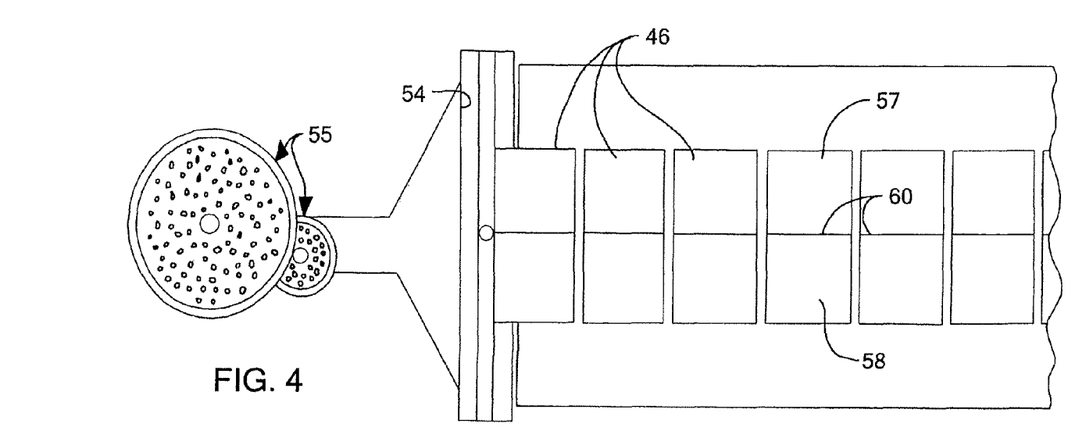
FIG. 4 is a top plan view of one embodiment which is illustrated in FIG. 3, wherein the skin or capstock material covers a portion of the top surface of the extrudate.

With reference now to FIGS. 3 and 4, it will be seen that the extrudate 45 is cut into a plurality of multiple layer preliminary shingle shapes 46, in that the process as shown in FIGS. 3 and 4 is a co-extrusion process, whereby a capstock or skin material 47 may be extruded through extruder 48, while a core material 50 is extruded through another extruder 51, each with their own thermoplastic heating systems 52, 53, such that the discharge mouth 54 of the co-extruder 55 produces multiple layer preliminary shingle shapes 46, as shown.

The other details of the apparatus as shown in FIGS. 3 and 4, including the guillotine, anvil, conveyor belt, rollers, etc. are all otherwise similar to the comparable items described above with respect to FIGS. 1 and 2.

The conveyor will preferably have a take-off speed that is matched to the extrusion speed, such that after extrusion of a given length, the cutting is effected by the guillotine or the like, and the speed of the conveyor can be controlled. Alternatively, two conveyors may be disposed serially, with the speed of the upper run of the first conveyor being accelerated to deliver the shapes to the second conveyor after cutting, with the speed of the first conveyor then being re-set to match the extrusion speed of extrudate leaving the extruder, with the second conveyor being controlled for delivery of the shapes to the mold. Alternatively, rather than having the delivery being automatic, the same could be done manually, if desired.

Thus, with reference to FIGS. 3 and 4, the multiple layer preliminary shingle shapes 46 are delivered generally rightward, in the direction of the arrow 56.

It will be noted that the preliminary shingle shapes 46 that are co-extruded as shown in FIGS. 3 and 4 are illustrated as comprising preliminary shingle shapes comprising a core material 57 that is substantially the full length of the shapes as shown in FIG. 4, with a capstock material 58 on an upper surface thereof, that is slightly more than half the dimension of the full length of the shingle shapes 46 shown, terminating at 60 as shown. Alternatively, capstock material 58 could cover a lesser or greater portion of the upper surface, or even the entire upper surface of the shingle shape.

Figure 5:
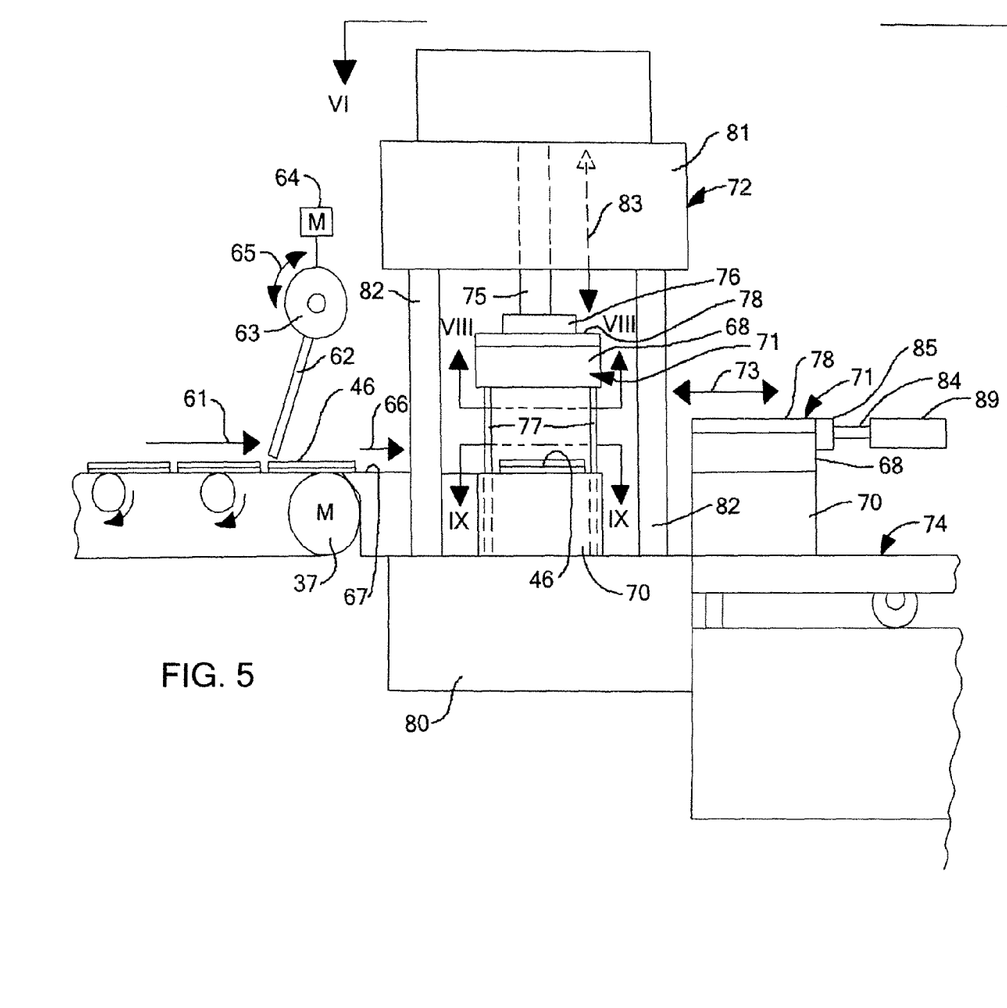
FIG. 5 is a schematic vertical elevational view of a compression molding station adapted to receive preliminary shingle shapes delivered from the right-most end of the illustrations either of FIGS. 1 and 3, for compression molding the shapes into their final configuration.

Referring now to FIG. 5, it will be seen that the shapes 46 or 33, as may be desired, are delivered via the conveyor belt, in the direction of the arrow 61, to be placed between mold components in a press, to be compression molded as will be described hereafter. In lieu of a conveyor belt, a moveable tray, a carrier, a platform or other means of supported transport could be used.

It will be noted that the extrusion and co-extrusion processes described above are continuous processes, and that the severing of the extrudate of whichever form by the guillotine is a serial, or substantially continuous process, and that the delivering of the preliminary shingle shapes from the extruder or co-extruder along the conveyor belt allows for the dissipation of heat resulting from the extrusion process, from the preliminary shingle shapes, in that, by allowing the shapes to substantially cool prior to placing them in the mold, rather than requiring the cooling to take place completely in the mold itself, reduces the required time for residence of the shapes in the mold during the compression process, as will be described hereinafter.

It will also be noted that maintaining the temperature above a melting temperature so that a quick flow of the melt can occur in the mold is desired in some embodiments. This maintaining of temperature above a crystallization or solidification temperature can minimize the development of internal stresses within the preliminary shingle shapes that could be caused by deformation of polymers that have begun to enter the solid state.

As the preliminary shingle shapes approach the right-most end of the conveyor belt as shown in FIG. 5, some suitable mechanism, such as the pusher rod 62, shaft-mounted at 63 and suitably motor-driven by motor 64, and operating in a back-and-forth motion as shown by the double-headed arrow 65, pushes shapes 46 (or 33) rightward, in the direction of the arrow 66, along table 67, to the position shown, between upper and lower mold components 68, 70, respectively.

The mold generally designated 71 in FIG. 5 and comprised of upper and lower mold components 68, 70, respectively, is movable into and out of its position as shown at the center of the ram mechanism 72, in the direction of the double-headed arrow 73, from an indexable table 74 that will be described hereinafter. The ram mechanism 72 operates like a press, wherein a ram 75 is pneumatically, hydraulically or electrically driven, generally by means of a piston or the like within the upper end of the ram mechanism, for driving an electromagnet 76 carried at the lower end of the ram 75, for lifting the upper mold component 68 upwardly as shown.

The closing of the mold can be done, at a force of, for example, 40 tons, in order to cause a material flow out on the edges of the shingle being molded, for 3-4 seconds, with the entire molding process as shown in FIG. 5 taking approximately one minute, after which the cooling of the molded material can take place, followed by removal of the molded material (shingle) from the mold, for subsequent or simultaneous trimming of the flashing therefrom. More preferably, a shorter molding cycle of 45 seconds can also be used.

The two mold components 68 and 70, when moved from the closed position on table 74 shown at the right end of FIG. 5, to the open position shown at the center of the ram mechanism 72 of FIG. 5, separate such that the upper component 68 is movable upwardly and downwardly along guide rods 77, as the electromagnet 76 lifts a preferably ferromagnetic cap 78 carried by the upper mold component 68, such that, in the open position shown for the mold 71 in FIG. 5, a transfer mechanism 62 may move a preliminary shingle shape 46 (or 33) along the table 67 in the direction of the arrow 66, to a position between the open mold components 68, 70 as shown.

The ram mechanism 72, itself, is comprised of a base member 80 and a compression member 81, and the member 81 carries the ram 75. The compression member 81 also moves vertically upwardly and downwardly, via its own set of guide rods 82, in the direction of the double-headed arrow 83, and is suitably driven for such vertical movement by any appropriate means, such as hydraulically, pneumatically, electrically (not shown).

Figure 6:
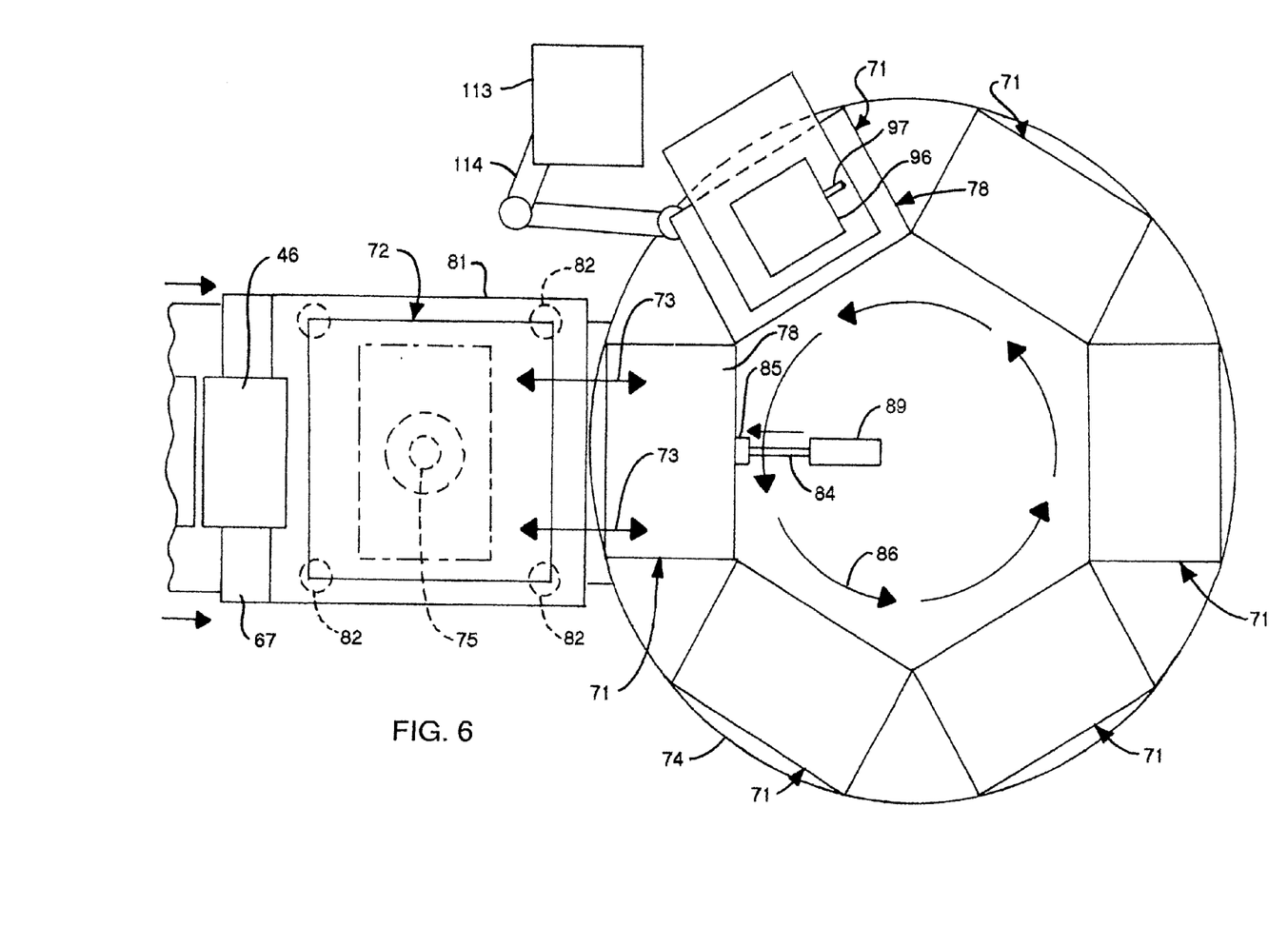
FIG. 6 is a top view of the compression molding station of FIG. 5, taken generally along the line VI-VI of FIG. 5, and with an indexable mold handling table illustrated at the right end thereof, with a robot and robot arm being schematically illustrated for removal of shingles from molds carried by the indexable table.
Figure 7:
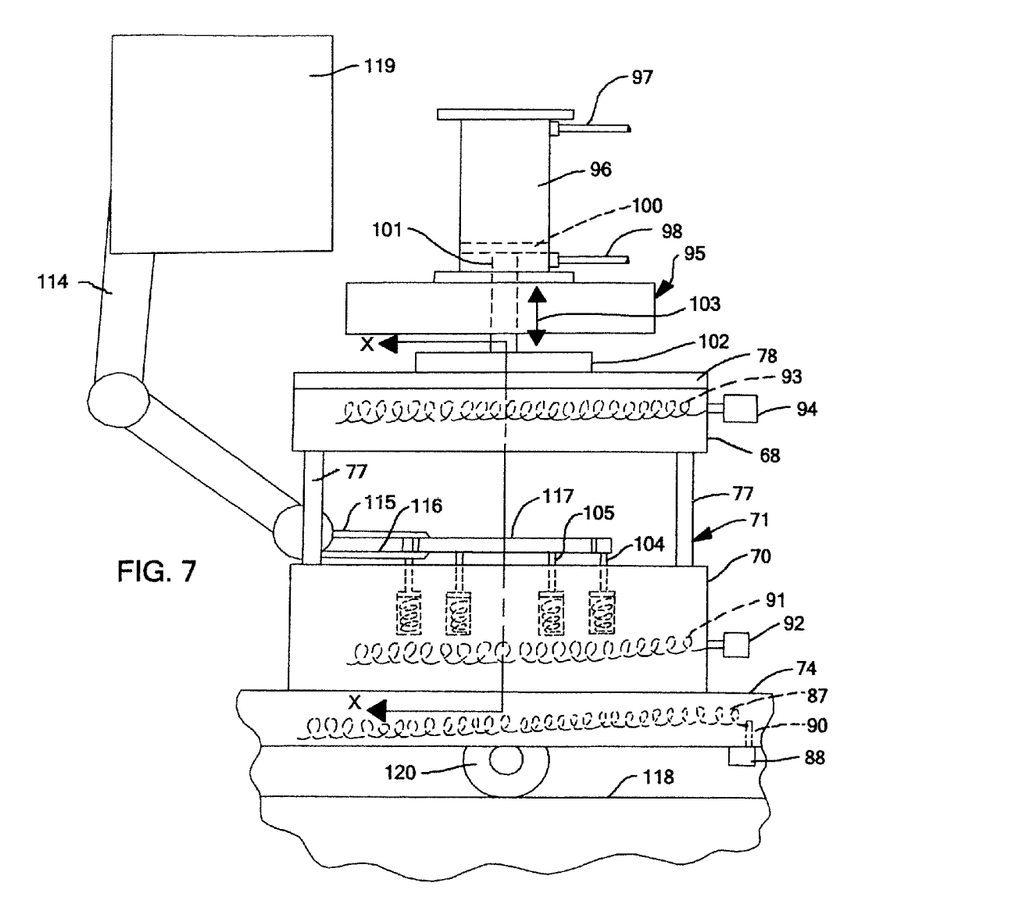
FIG. 7 is a schematic elevational view of upper and lower mold components shown in the open position, at one of the stations on the indexable table, with the indexable table fragmentally illustrated, and with a robot arm for lifting the finished shingle from the mold.

With reference now to FIGS. 6 and 7, it will be seen that the mold 71 may be moved to and from the ram mechanism 72, in the direction of the double-headed arrow 73, by any appropriate means, such as by means of a hydraulic or pneumatic push/pull cylinder 89, driving a rod 84, that in turn has an electromagnetic push/pull plate 85, for engaging the ferromagnetic cap 78 of the upper mold component 68, as shown in FIGS. 5 and 7.

The indexable table 74 is rotatably driven by any suitable means (not shown), to move mold assemblies 71 into position for delivering them to and from the ram station 72 as discussed above. In this regard, the indexable table 74 may be moved in the direction of the arrows 86.

If desired, in order to facilitate cooling, cooling coils may be embedded in, or otherwise carried by the table 74, such coils being shown in phantom in FIG. 7, at 87, fed by a suitable source 88 of coolant, via coolant line 90, as shown. The coolant can be water, ethylene glycol, or any other useful coolant as may be desired.

Similarly, coolant coils are shown in phantom at 91 in FIG. 7 for the lower mold component 70 and may be provided with coolant from a suitable source 92, if desired. Also, optionally, the upper mold component 68 may be provided with internal coolant coils 93, shown in phantom in FIG. 7, likewise supplied by coolant from a suitable source 94.

Upon the shapes 33 or 46 entering the mold, they may have a surface temperature of 300° F.-320° F., with the temperature being hotter in the center of the core material. Upon leaving the mold, the surface temperature of the shapes will normally be in the range of 80° F.-85° F.

Within the mold, it is preferable to heat the top mold component 68 (which will preferably engage the capstock material) to a slightly greater temperature than that of the bottom component 70, in order to control internal stress development. For example, the top component 68 may be heated to 120° F., for example, with the bottom component being heated to 70-80° F. The subsequent cooling for the top plate 68 could be a natural cooling by simply allowing heat to dissipate, and the bottom plate can be cooled, for example, by well water, at about 67° F. Alternatively, well water or other coolant could be circulated, first through the bottom component 70 and then to the top component 68, however, in some instances it can be preferable to cool both components 68 and 70 to the same temperature. It will also be understood that various other cooling techniques can be employed to regulate temperature at various locations in the mold, depending upon the thickness of the shingle being molded, in various locations of the shingle being molded, as may be desired.

At one of the stations shown for the indexable table 74, a lifting mechanism 95 may be provided, for opening the molds 71, one at a time. A typical such lifting mechanism may include a hydraulic or pneumatic cylinder 96, provided with fluid via fluid lines 97, 98, for driving a piston 100 therein, which carries a drive shaft 101 that, in turn, carries an electromagnet 102 for engaging the cap 78 of the upper mold component 68, as the drive shaft 101 is moved upwardly or downwardly as shown by the double-headed arrow 103.

The closing of the components 68 and 70 relative to each other could alternatively be done under a force of 30 tons, rather the 40 tons mentioned above, in order to obtain a consistent closing and flow of material. Alternatively, the closing could begin at a high speed, and then gradually slow down, in order get an even flow at an edge of the shape that is being formed into a shingle.

Figure 10:
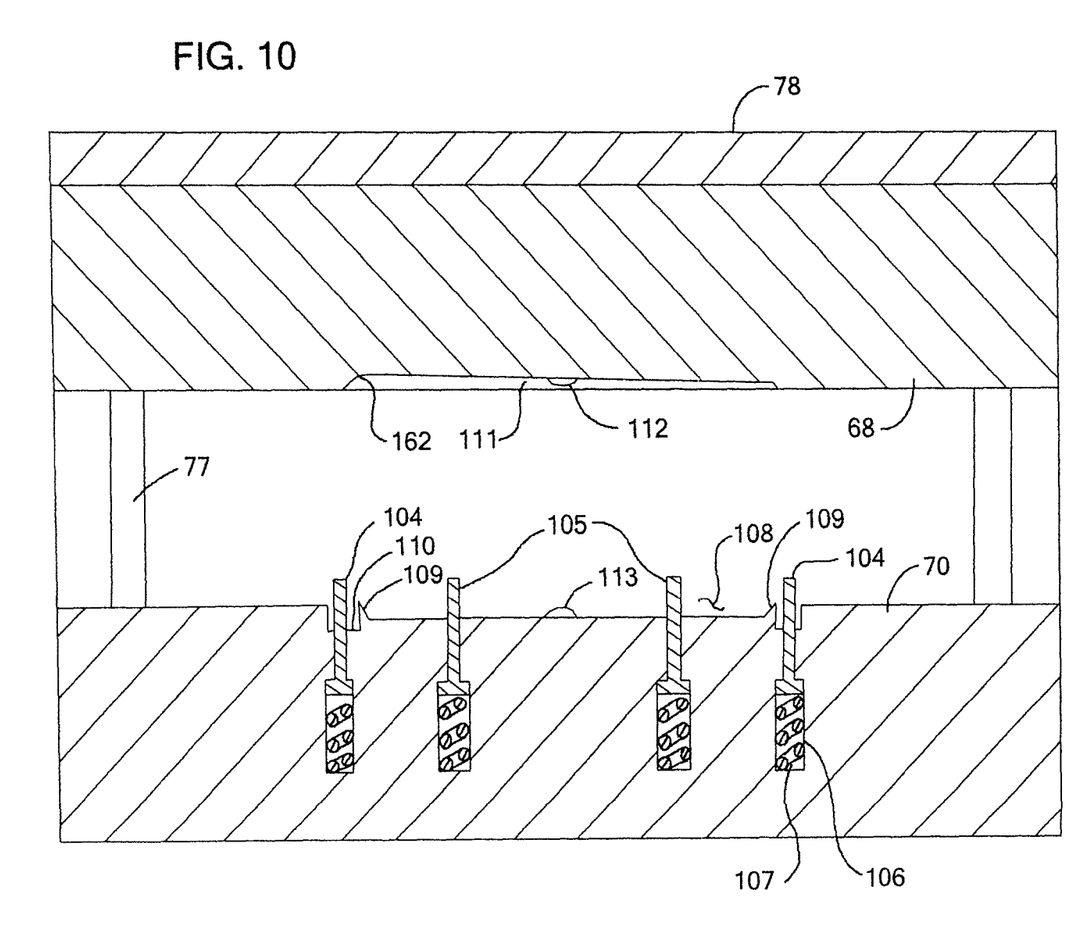
FIG. 10 is an enlarged vertical sectional view, taken through the upper and lower mold components, generally along the line X-X of FIGS. 8 and 9.

When the mold 71 is in the open position shown in FIG. 7, and as is shown in greater detail in FIG. 10, a plurality of spring pins 105, mounted in lower mold component 70, in generally cylindrical cavities 106 thereof, are pushed upwardly by means of compressed springs 107, such that the upper ends of the spring pins engage the compression molded shingle and pushed the same out of the lower mold cavity 108.

Similarly, spring pins 104 engage "flashing", or other material that has been cut away from the periphery of the formed shingle, for pushing the same out of the trench 110 that surrounds the cavity 108 in the lower mold component 70.

Figure 9:
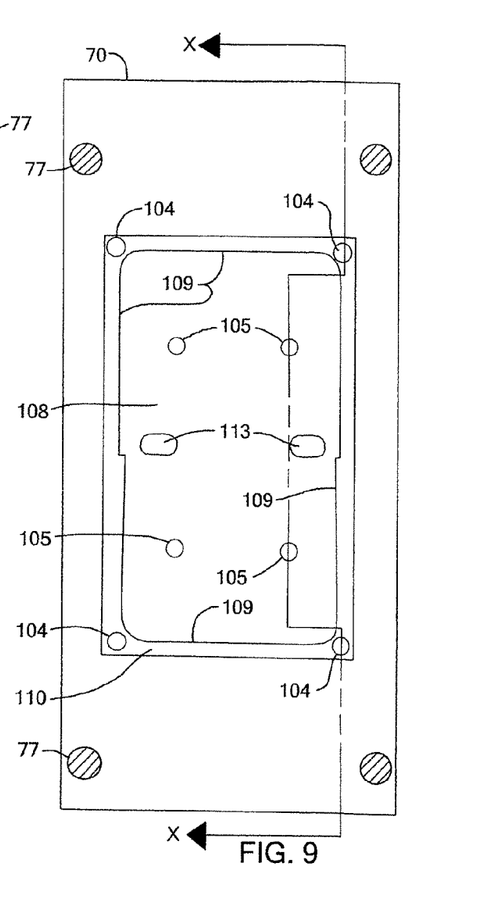
FIG. 9 is an enlarged generally plan view of a lower mold component, taken generally along the line of IX-IX of FIG. 5.

As shown in FIGS. 9 and 10, the lower mold 70, has, at the periphery of its cavity 108, an upstanding cutting blade 109 separating the mold cavity 108 from the peripheral trench 110, for cutting the preliminary shingle shapes placed therein to the precisely desired dimensions of the final shingle, during the compression molding process. That is, generally, the preliminary shingle shapes may be slightly larger in size than the final shingle shape, to enable the cutting edge 109 to achieve the final desired dimensions for the shingle. The cutting of flashing from the shingle should be done quickly, and it is preferably done in the mold. The flashing can be recycled back for re-use, most preferably for use as part of subsequent core material. While the trimming of the flashing can be done in the mold, it could, alternatively, be done as a secondary trimming and finishing operation which, in some cases may be more cost effective than trimming in the mold.

Both the upper and lower mold cavities 111 and 108 are preferably provided with protrusions 112, 113, respectively, which protrusions will form reduced-thickness nailing or fastening areas in the compression molded shingle, as will be described hereinafter.

With the fully formed shingle as shown in FIG. 7 having been lifted upwardly out of a lower mold component 70 by means of the spring pins, a computer control robot mechanism 119 or the like may control a robotic arm 114, having shingle-engaging fingers 115, 116, adapted to engage upper and lower surfaces of the compression molded shingle 117, and move the same horizontally out from between upper and lower mold components 68, 70, to another location for storage or delivery to another station, as may be desired.

Thereafter, the indexable table 74 may be moved, for delivery of a next adjacent mold to the station for engagement by the lift mechanism 95, with the table 74, generally being rotatable on a floor 118, as allowed by a number of table-carrying wheels 120.

Figure 8:
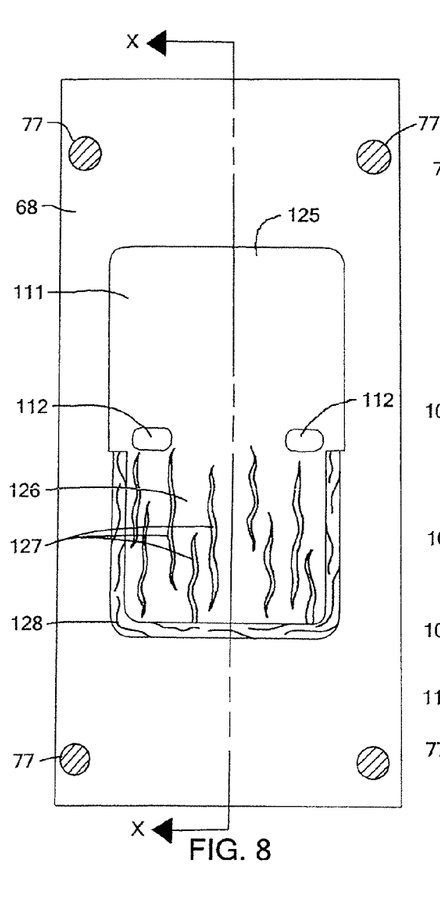
FIG. 8 is an enlarged generally plan view of an upper mold component, taken generally along the line of VIII-VIII of FIG. 5.

Referring now to FIGS. 8 and 9, specifically, it will be seen that the upper mold component 68 (FIG. 8) has a generally rectangular shaped upper mold cavity 111 that is essentially the shape of a natural slate shingle having a headlap portion 125 and a butt or tab portion 126. It will be noted that in the headlap portion there are a plurality of protrusions 112 that define reduced thickness areas in the compression molded shingle 117, to serve as nailing or fastening areas, to make it easier for nails or other fasteners to penetrate the shingle 117 when it is nailed to a roof.

There are also a plurality of mold recesses or protrusions 127 as may be desired, to build into the shingle 117 the appearance of a natural slate, tile or the like. It will be understood that the number and style of the recesses/protrusions 127 will be varied to yield a natural-appearing shingle having the desired aesthetics.

In the tab or butt portion of the shingle 126, there is a gradually sloped reduced-thickness portion 128 that appears in FIG. 8 to be U-shaped, and which defines the periphery thereof. This sloped reduced-thickness portion 128, as shown in FIGS. 8 and 10 will serve to cause the capstock layer of the preliminary shingle shape being engaged, to flow peripherally outwardly around the edges of the core layer of material, such that, in the finished shingle, the exposed edges will be covered by capstock material, as well as the exposed surface, such that the edges of the core layer of shingle are weather-protected.

With reference to FIG. 9, it will be seen that the lower mold component 70 is provided with a lower mold cavity 108, also having protrusions 113 therein, for effecting a reduced-thickness nailing or fastening area for applying a shingle to the roof, in the final shingle 117. It will be understood that, alternatively, the mold cavity 111 could be the lower mold cavity and that the mold cavity 108 could be the upper mold cavity, if desired.

The spring pins 104, 105, and the trough 110 and mold depression 108, respectively, as described previously, are also shown in FIG. 9.

Figure 11:
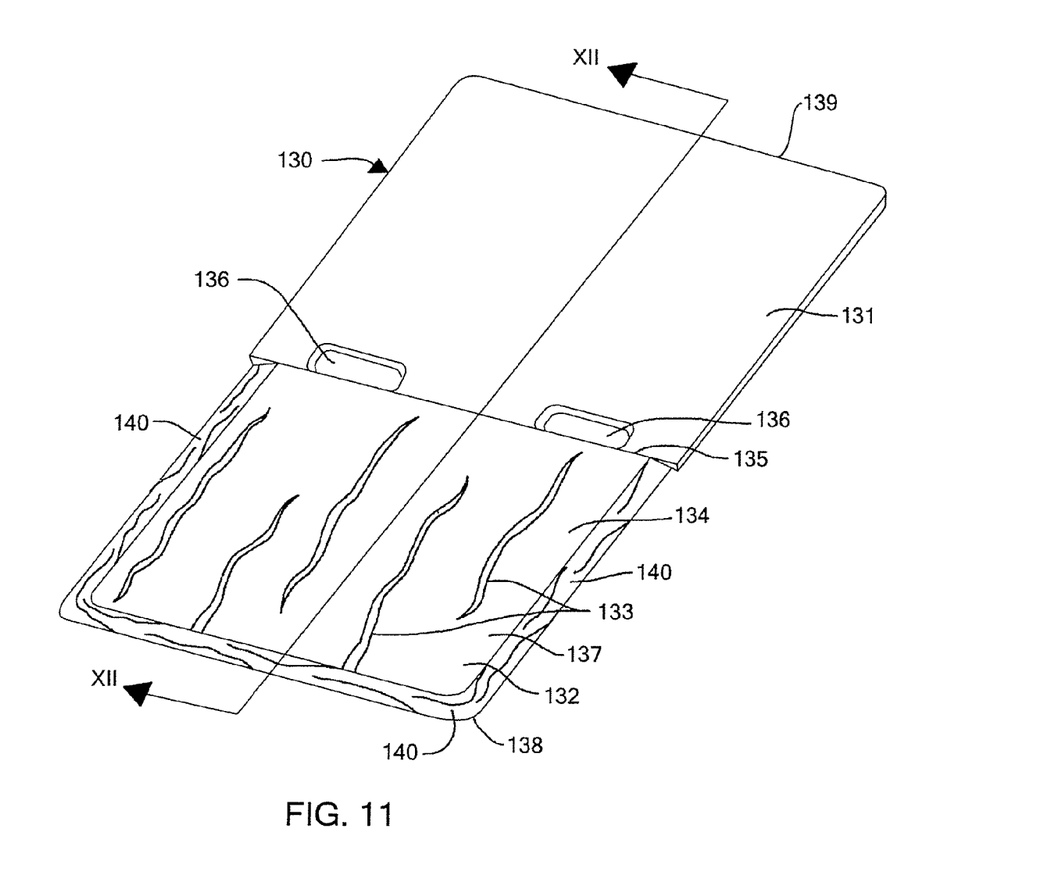
FIG. 11 is a top perspective view of a finished shingle made in accordance with this invention.

It will thus be seen that the two mold components 68 and 70 are thus adapted to compression mold a shingle such as that which is shown by way of example only, in FIG. 11.

The shingle of FIG. 11 thus has a headlap portion 131 and a butt or tab portion 132, with relief or other aesthetically pleasing areas 133, as shown, and with the butt or tab portion 132 having a capstock or skin 134 thereon, in the lower half of the shingle, terminating in upper capstock edge 135, such that, when shingles 130 are installed on a roof, a next-overlying tab or butt portion of a shingle will cover the upper end, or headlap portion 131 of the shingle 130. Alternatively, the capstock or skin 134 could cover a greater portion or even the entire top surface 137 of the shingle 130 (not shown). For example, the edge of the capstock coverage could optionally extend to be coincident with the upper edge 139 of the shingle 130.

It will also be noted that there are nailing or other fastener reduced-thickness portions 136, in the shingle of FIG. 11, and that the U-shaped periphery along the right and left sides and lower edge of the shingle 130 slope downwardly from the top surface 137 to the lower surface 138, as shown at 140.

Figure 12:
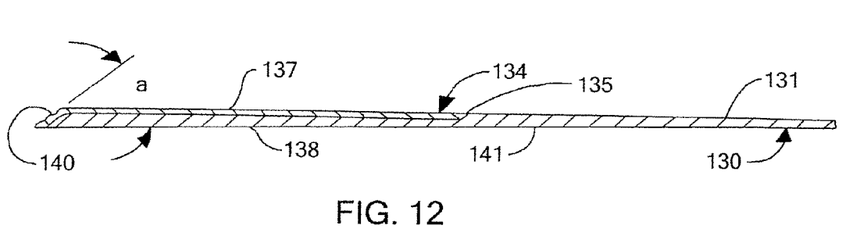
FIG. 12 is a vertical sectional view, taken through a shingle made in accordance with this invention, generally along the line XII-XII of FIG. 11, wherein the shingle is comprised of two single layers of material, one being a core layer and the other being a partial capstock or skin layer.

With reference now to FIG. 12, it will be seen that the slope of the edges 140 is at an angle "a", as shown in FIG. 12, which angle "a" will preferably be on the order of about 45 degrees (135 degrees between surfaces 137 and 140), and that such slope may be other than a straight line, such as having some aesthetic irregularity built into the shingle 130, as shown at the left end of FIG. 12.

It will thus be seen that the skin or capstock material 134 can substantially encapsulate the tab or butt portion of the shingle of FIGS. 11 and 12, that is to be the exposed portion of the shingle 130 when the shingle is installed on a roof, leaving the core material 141 to comprise a majority of the volume of the shingle 130.

In another embodiment, the skin or capstock material can substantially encapsulate the entire top surface of the shingle 130, the core material comprising a majority of the volume of the shingle 130. In this embodiment portions of an underlying shingle between a pair of adjacent shingles in an overlying course are protected with the more durable skin or capstock material.

It will be understood that the core is preferably constructed of an inexpensive material, and that the capstock is preferably constructed of a material, such as but not limited to, a polymer having a high weather resistance and the ability to be colored in various colors, as well as desirable ultraviolet characteristics. In this case where a capstock also covers the upper portion or headlap area of the top surface of the shingle 130, the capstock on the upper portion may be of the same or different color or appearance as that covering the lower portion 134.

It will also be understood that the shingle 130 may be constructed in various other configurations, to have edges that are segmented, scalloped or the like, or as may be desired. The relief areas 133 may comprise lines, grooves, or seemingly random relief, as may be desired, all to give the appearance of natural material such as slate, tile, cedar shake or the like. It will also be apparent that the shingles or tiles 130 may be constructed of various sizes as may be desired.

Figure 12A:
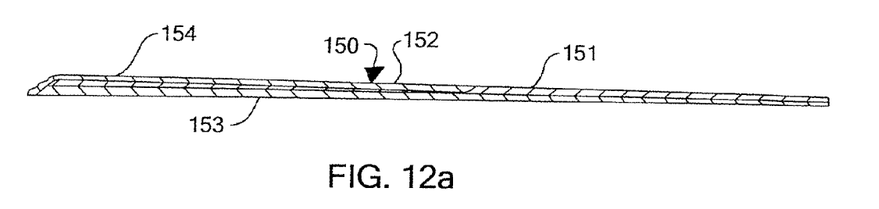
FIG. 12a is an illustration like that of FIG. 12, but wherein the shingle is comprised of three layers of material.

With reference to FIG. 12*a*, it will be seen that a shingle 150 is provided, also having a core material 151 and a capstock material 152, like that of the shingle 130 of FIG. 12, but wherein a third layer 153 of another material is provided, that essentially sandwiches the core material 151 between the capstock material 152 and the third layer 153 of material, in the tab or butt portion 154 of the shingle. The shingle of FIG. 12*a* can be constructed as described in the processes above, especially with respect to the processes described in FIGS. 3 and 4, wherein there is a co-extrusion; however, the co-extrusion in the case of the embodiment of FIG. 12*a* would be in the form of three material layers rather than two layers, with the bottom layer 153 being comprised either of the same material as that of the capstock layer 152, or of a different, third layer.

The core material will generally be of greater thickness than the skin material and will preferably be comprised of a highly filled polymer. The skin material will preferably be comprised of a polymer having high weather resistance and the ability to be colored in various colors as may be demanded by building designers.

The relative thickness of the capstock material to that of the core material can be about 10%, although, if additional capstock thickness is desired, one can increase this relative thickness up to about 20%. The minimum thickness of the capstock material should be on the order of about 4 mils, and the range for the same could be from about 4 mils up to about 10 mils. In some instances, a 5% ratio of capstock material to the total thickness of the shingle can suffice, such that the capstock material would comprise 5% of the total thickness, with the core material comprising 95% of the total thickness of the shingle.

It will also be understood that variations can be made in the mold design, by varying angles, radiuses and the like to avoid excessive thinning of the capstock material, all with a view toward controlling the capstock coverage of the core material, not only on the major surfaces, but also at the edges. Mold design can also be used to provide recesses or indentations in the lower surface of the shingle, thus allowing lesser amounts of material to be used.

By combining a skin material with a core material, such allows an economic advantage in that a greater amount of filler may be used to comprise the core, which will be of less expense than the material that comprises the skin, without providing undesirable surface properties for the skin, and without limiting the aesthetics of the product, because the core is, at least partially, encapsulated in an aesthetically pleasing and weatherable skin. Additionally, the core can be comprised of a foam or microcellular foam material where reduced weight for the product is desired.

In some embodiments the shingle or tile is comprised of a core that is made of a low molecular weight material such as polypropylene filled with 40-80% by weight of recycled ash with suitable functional additives, encapsulated in a skin comprised of a film.

Such fillers for the core material can vary considerably and can be chosen from a group that includes, as examples, treated and untreated ashes from incinerators of power stations, mineral fillers and their waste, pulp and paper waste materials, oil shale, reclaimed acrylic automotive paint and its waste and/or mixtures of any of these, or the like.

The skin can be chemically cross-linked to increase its mechanical properties and weather resistance and/or flame resistance and can contain functional additives such as pigments, UV light stabilizers and absorbers, photosensitizers, photoinitiators etc. The cross-linking may occur during or after processing of the material. Such cross-linking can be effected by means which include, but are not limited to, thermal treatment or exposure to actinic radiation, e.g. ultraviolet radiation, electron beam radiation, gamma radiation, etc.

By way of example, the skin material is selected from a group of thermoplastic materials comprising Polyolefins such as thermoplastic olefins, Polyethylene (PE), Polypropylene (PP), Polymethylpentene (PMP), Ethylene Acrylic Acid (EAA), Ethylene Methacrylic Acid (EMAA), Acrylonitrile Styrene Acrylate (ASA), Acrylonitrile Ethylene Styrene (AES) and Polybutene (PB-1), their copolymers, blends, and filled formulations, other polymers having high weather resistance such as Polyacrylates and fluoropolymers and/or their copolymers blends and filled formulations. The skin material is preferably stabilized for UV-light and weathering resistance by using additives and additive packages known in the state-of-the-art to be efficient. In addition, the skin materials may also contain various additives such as thermal and UV-light stabilizers, pigments, compatibilizers, processing aids, flame retardant additives, and other functional chemicals capable of improving processing of the materials and performance of the product. Foaming agents such as azodicarbonamide may be used to reduce the density of the skin material.

By way of example, the core material may be selected from the group comprising of virgin thermoplastic polymer materials and elastomers and rubber including but not limited to Polyvinylchloride (PVC), Polyethylene (PE), Polypropylene (PP), Polybutene (PB-1), Polymethylpentene (PMP), Polyacrylates (PAC), Polyethyleneterephthalate (PET), Polybutyleneterephthalate (PBT), Polyethylenenaphthalate (PEN), Ethylene-Propylene-Diene Monomer Copolymers (EPDM), Styrene Butadiene Styrene (SBS), Styrene Isoprene Styrene (SIS), Acrylonitrile Butadiene Styrene (ABS), or Nitrile Rubber, their copolymers, binary and ternary blends of the above, and filled formulations based on the above and other thermoplastic materials and elastomers with mineral, organic fillers, nanofillers, reinforcing fillers and fibers as well as recycled materials of the above polymers.

From the cost point of view, recycled and highly filled thermoplastic materials and recycled rubber (for example from tires) are preferable. The content of mineral fillers can be in the weight range from 5% to 80%.

In addition, the core materials may also contain various additives such as thermal and ultraviolet (UV) light stabilizers, pigments, compatibilizers, processing aids, flame retardant additives, and other functional chemicals capable of improving processing of the materials and performance of the product. Some flame retardants known to have negative effects on weather resistance of polymers can still be effectively used in the core material, the skin or capstock layer serving to protect the shingle from the effects of the weather. Chemical foaming agents such as azodicarbonamide may be used to reduce the density of the core material. Physical blowing agents, glass bubbles or expanded polymer microspheres may also be used to adjust the density of the core material.

In making the products of this invention, the single layer 152 of skin or combined upper and lower layers 152 and 153, of the skin may comprise from 1% to 40% of the total thickness of the product, with the core inside the skin being thicker between upper and lower surfaces and comprising the remaining percentage of the total thickness of the product.

Examples of making shingles in accordance with this invention are as follows.

EXAMPLE 1

Pellets of a flexibilized polypropylene copolymer, 18S2A, available from Huntsman Chemical, Salt Lake City, Utah, were combined in a Werner Pfleiderer twin screw extruder with calcium carbonate, Hubercarb Q3, available from J. M. Huber Corporation, Atlanta, Ga., and a stabilizer package, FS-811, available from Ciba Specialty Chemicals, Tarrytown, N.Y., using gravimetric feeders to obtain a mixture that was 49.25 wt % polypropylene, 50 wt % calcium carbonate and 0.75% stabilizer package. This mixture was extruded as a strand and chopped into pellets of filled polypropylene for later processing.

EXAMPLE 2

Pellets of Example 1 were dried and fed into a single screw extruder, MPM 3.5 inch in diameter, 24:1 L/D, equipped with a flex lip die and extruded to form a sheet. The die was adjusted to produce an extrudate that was about 19 inches in width and having a profile with varying thickness across the sheet ranging from about 0.375 inches to 0.245 inches. The sheet was extruded onto a first conveyor belt having variable speed matched to the extrudate speed. The temperature of the sheet was about 380 F when exiting the die.

When a section of sheet 13 inches in length had been extruded, the sheet was cut from the die lip. While still hot, the section of 19"×13" sheet was carried to a second conveyor belt and transferred to and centered on the lower plate of a mold having a size of 18"×12". Infrared lamps were provided above the conveyor to maintain the temperature of the sheet during transfer. On reaching the lower mold plate, the surface temperature was about 300 F. The upper portion of the mold, having a surface texture designed to represent the surface texture of a natural slate, was brought into contact with the sheet on the lower plate and the mold was closed in a platen press with 20 tons pressure to shape and form the sheet, with a slight excess of material being squeezed out of the mold.

Cooling was applied to the mold by means of water circulating cooling lines in the mold plates to cool the formed sheet to a solid state. After about 1 minute, the mold was opened to release a short cycle compression molded synthetic roofing tile. The synthetic roofing tile had cooled to a surface temperature of about 80 F on the side that had been in contact with the bottom plate and to temperature of about 120 F on the surface that had been molded by the top plate of the mold set. Excess material and flashing were cut off of the tile.

EXAMPLE 3

Pellets of a flexibilized polypropylene copolymer, 18S2A, available from Huntsman Chemical, Salt Lake City, Utah, were combined in a Werner Pfleiderer twin screw extruder with calcium carbonate, Hubercarb Q3, available from J. M. Huber Corporation, Atlanta, Ga., using gravimetric feeders to obtain a mixture that was 50 wt % polypropylene and 50 wt % calcium carbonate. This mixture was extruded as a strand and chopped into pellets of filled polypropylene for later processing.

EXAMPLE 4

Pellets of a flexibilized polypropylene copolymer, 18S2A, available from Huntsman Chemical, Salt Lake City, Utah, were combined in a Werner Pfleiderer twin screw extruder with calcium carbonate, Hubercarb Q3, available from J. M. Huber Corporation, Atlanta, Ga., and a stabilizer package, FS-811, available from Ciba Specialty Chemicals, Tarrytown, N.Y., using gravimetric feeders to obtain a mixture that was 79.25 wt % polypropylene, 20 wt % calcium carbonate and 0.75% stabilizer package. This mixture was extruded as a strand and chopped into pellets of filled polypropylene for later processing.

EXAMPLE 5

Pellets of filled polypropylene from Example 3 were dried and fed into a first single screw extruder, MPM 3.5 inch in diameter, 24:1 L/D, to provide core material. Separately, dried pellets of filled polypropylene from Example 4 and pellets of gray toner 60Z2274 available from Penn Color, Doylestown, Pa., were fed using gravimetric feeders to obtain a ratio of 2 wt % gray toner to 98 wt % filled polypropylene into a second extruder, Prodex 2.5 inch in diameter 24:1 L/D, to provide capstock material. The output of both extruders was fed through an adapter block and a dual layer coextrusion block to a flex lip die and coextruded to produce a sheet having a core of material from the first extruder bonded with a coextruded capstock provided by the second extruder, with the layer of capstock covering the top surface of the layer of core material.

The die was adjusted to produce an extrudate that was about 19 inches in width and having a profile with varying thickness across the sheet ranging from about 0.375 inches to 0.245 inches. The relative rates of extrusion from the two extruders for the capstock and the core layers were controlled such that the capstock thickness was about 10% of the total thickness of the composite sheet, The sheet was extruded onto a first conveyor belt having variable speed matched to the extrudate speed. The temperature of the sheet was about 380 F when exiting the die, When a section of sheet 13 inches in length had been extruded, the sheet was cut from the die lip. While still hot, the section of 19"×13" sheet was carried to a second conveyor belt and transferred to and centered on the lower plate of a mold having a size of 18"×12". Infrared lamps were provided above the conveyor to maintain the temperature of the sheet during transfer. On reaching the lower mold plate, the surface temperature was about 300 F. The upper portion of the mold, having a surface texture designed to represent the surface texture of a natural slate, was brought into contact with the sheet on the lower plate and the mold was closed in a platen press with 20 tons pressure to shape and form the sheet, with a slight excess of material being squeezed out of the mold. The flow of material at the edges of the mold was such that the capstock thickness at the molded edges of the shape was maintained to be least 4 mils over the entire top surface of the piece, even at the edges.

Cooling was applied to the mold by means of water circulating cooling lines in the mold plates to cool the formed sheet to a solid state. After about 1 minute, the mold was opened to release a short cycle compression molded synthetic roofing tile having a core layer and a capstock layer. The synthetic roofing tile had cooled to a surface temperature of about 80 F on the side that had been in contact with the bottom plate and to temperature of about 120 F on the surface that had been molded by the top plate of the mold set. Excess material and flashing were cut off of the tile.

EXAMPLE 6

Dried pellets of filled polypropylene from Example 3 were fed into a first single screw extruder, MPM 3.5 inch in diameter, 24:1 L/D, to provide core material. Separately, dried pellets of filled polypropylene from Example 4, pellets of gray toner 60Z2274 and black accent color pellets 68B282, available from Penn Color, Doylestown, Pa., were fed using gravimetric feeders to obtain a ratio of 2 wt % gray toner, 1 wt % accent color pellet, and 97 wt % filled polypropylene into a second extruder, Prodex 2.5 inch in diameter 24:1 L/D, to provide capstock material. The output of both extruders was fed through an adapter block and a dual layer coextrusion block to a flex lip die and coextruded to produce a sheet having a core of material from the first extruder bonded with a coextruded capstock provided by the second extruder, with the layer of capstock covering the top surface of the layer of core material.

The temperatures in degrees Fahrenheit of the zones of the capstock extruder, the adapter, the coextrusion block and the die are noted below:

| Barrel zone | | | | Adapter zone | | | | Die zone | | |
|---|---|---|---|---|---|---|---|---|---|---|
| 1 | 2 | 3 | 4 | 1 | 2 | 3 | Co-Ex block | 1 | 2 | 3 |
| 320 | 330 | 330 | 330 | 370 | 375 | 375 | 375 | 375 | 375 | 375 |

The die was adjusted to produce an extrudate that was about 19 inches in width and having a profile with varying thickness across the sheet ranging from about 0.375 inches to 0.245 inches. The relative rates of extrusion from the two extruders for the capstock and the core layers were controlled such that the capstock thickness was about 10% of the total thickness of the composite sheet. The sheet was extruded onto a first conveyor belt having variable speed matched to the extrudate speed. The temperature of the sheet was about 380 F when exiting the die.

When a section of sheet 13 inches in length had been extruded, the sheet was cut from the die lip. While still hot, the section of 19"×13" sheet was carried to a second conveyor belt and transferred to and centered on the lower plate of a mold having a size of 18"×12". Infrared lamps were provided above the conveyor to maintain the temperature of the sheet during transfer. On reaching the lower mold plate, the surface temperature was about 300 F. The upper portion of the mold, having a surface texture designed to represent the surface texture of a natural slate, was brought into contact with the sheet on the lower plate and the mold was closed in a platen press with 20 tons pressure to shape and form the sheet, with a slight excess of material being squeezed out of the mold. The flow of material at the edges of the mold was such that the capstock thickness at the molded edges of the shape was maintained to be least 4 mils over the entire top surface of the piece, even at the edges.

Cooling was applied to the mold by means of water circulating cooling lines in the mold plates to cool the formed sheet to a solid state. After about 1 minute, the mold was opened to release a short cycle compression molded synthetic roofing tile having a core layer and a variegated capstock layer, the capstock having a base gray color with gray-black accent streaks simulating the color appearance of natural slate. The synthetic roofing tile had cooled to a surface temperature of about 80 F on the side that had been in contact with the bottom plate and to temperature of about 120 F on the surface that had been molded by the top plate of the mold set. Excess material and flashing were cut off of the tile.

EXAMPLE 7

Example 7 was prepared similarly to Example 6, except that the gray toner 60Z2274 was omitted from the capstock and the capstock composition was metered to include 1 wt % of the accent color pellet and 99 wt % of the filled polypropylene of Example 3. The short cycle compression molded synthetic roofing tile having a core layer and a variegated capstock layer was produced, the capstock having a light color with gray-black accent streaks simulating the color appearance of natural slate.

EXAMPLE 8

Example 8 was prepared similarly to Example 6, except that the temperature profile of the capstock extruder was at a slightly higher temperature as shown in the table below.

| Barrel zone | | | | Adapter zone | | | | Die zone | | |
|---|---|---|---|---|---|---|---|---|---|---|
| 1 | 2 | 3 | 4 | 1 | 2 | 3 | Co-Ex block | 1 | 2 | 3 |
| 350 | 350 | 350 | 350 | 370 | 375 | 375 | 375 | 375 | 375 | 375 |

The synthetic roofing tile having a core layer and a capstock layer was produced, the capstock having an even gray color, the accent color pellets having melted out into the mixture in the extruder.

EXAMPLE 9

Example 9 was prepared similarly to Example 6, except that a different accent color pellet, 60B281, available from Penn Color, was used with a capstock composition metered to 2 wt % gray toner 60Z2274, 2 wt % accent color pellet 60B281 and 96 wt % filled polypropylene of Example 3. The 60B281 had a higher softening temperature than the accent color pellet used in Example 6, so the temperature profile in the capstock extruder was modified as noted in the table below.

| Barrel zone | | | | Adapter zone | | | | Die zone | | |
|---|---|---|---|---|---|---|---|---|---|---|
| 1 | 2 | 3 | 4 | 1 | 2 | 3 | Co-Ex block | 1 | 2 | 3 |
| 390 | 390 | 400 | 380 | 370 | 375 | 375 | 375 | 375 | 375 | 375 |

In the synthetic roofing tile of Example 9, having a core layer and a capstock layer, the capstock had a base gray color, but also had gray-black spots where the accent color pellets had not melted sufficiently during the processing to produce the streaking effect.

It will be apparent from the foregoing that various other modifications may be made in the process steps of this invention, in the apparatus, or in the resultant roofing shingle or tile of this invention, all within the spirit and scope of the invention as defined in the appended claims.

What is claimed is:

1. Apparatus for making shingle or tile products comprising:
   (a) co-extruding means for co-extruding heated, unshaped thermoplastic materials from molten states in a co-extruder and discharging those unshaped thermoplastic materials from a mouth of the co-extruder into a formed, continuous shaped extrudate that includes a core material with a capstock product surfacing material on and adhered directly to at least a portion of a major surface of the core material of the continuous shaped extrudate and cutting means for then directly cutting the extrudate into a plurality of preliminary product shapes while the preliminary product shapes are above a solidification temperature;
   (b) delivering means for then delivering the preliminary product shapes serially along a path while allowing the preliminary product shapes to cool an amount that maintains the temperature of the preliminary product shapes above a solidification temperature;
   (c) delivering means for then delivering the cooled but still non-solid preliminary product shapes to a compression mold;
   (d) compression molding means for molding the preliminary product shapes in the mold by compression molding the preliminary product shapes to substantially their final product dimensions and controlling means for controlling internal stress development of the product shapes in the mold by having the capstock product surfacing material being at a greater temperature in the mold than the temperature of the core material in the mold; and
   (e) discharging means for then discharging the molded products from the mold and allowing the molded products to cool to a solid state.

2. The apparatus of claim 1, including means for cutting peripheral material from edge portions of the shingle in the mold.

3. The apparatus of claim 2, wherein the means for cutting peripheral material comprises means for doing the cutting as part of and substantially simultaneously with the compression molding step.

4. The apparatus of claim 1, including means for cooling the mold during the compression molding step.

5. The apparatus of claim 1, including means for pushing the extrudate away from the interior of the mold.

6. The apparatus of claim 1, wherein the preliminary product shapes are of a first size and the compression mold has a second size, and said first size is selected from the group consisting of the same as and greater than the second size.

7. The apparatus of claim 1, wherein the co-extruding means includes means for co-extruding more than two layers of thermoplastic material.

8. The apparatus of claim 1, wherein the delivering means of clause (c) includes means for transporting the preliminary product shapes to a compression mold, by transport means.

9. The apparatus of claim 1, including means for placing the preliminary product shapes between spaced apart male and female components of a mold that together have formed interiors that define substantially the final shape of the products and means for bringing the said components together under sufficient compression force to shape the preliminary product shapes into substantially the final dimensions of the products.

10. The apparatus of claim 9, including means for transferring the mold to a compression molding station where the compression molding takes place.

11. The apparatus of claim 10, wherein the means for transferring the mold includes an indexable table having a plurality of stations for molds, with means for serially transferring molds to and from the compression molding station where the compression molding takes place.

12. Apparatus for making shingle or tile products comprising:
   (a) co-extruding means for co-extruding heated, unshaped thermoplastic materials from molten states in a co-extruder and discharging those unshaped thermoplastic materials from a mouth of the co-extruder into a formed, continuous shaped extrudate that includes a core material with a capstock product surfacing material on and adhered directly to at least a portion of a major surface of the core material of the continuous shaped extrudate and cutting means for then directly cutting the extrudate into a plurality of preliminary product shapes while the preliminary product shapes are above a solidification temperature;
   (b) delivering means for then delivering the preliminary product shapes serially along a path while allowing the preliminary product shapes to cool an amount that maintains the temperature of the preliminary product shapes above a solidification temperature;
   (c) delivering means for then delivering the cooled but still non-solid preliminary product shapes to a compression mold;
   (d) compression molding means for molding the preliminary product shapes in the mold by compression molding the preliminary product shapes to substantially their final product dimensions, wherein the compression molding means includes flowing means for causing the surfacing material to flow over at least one edge of core material, to cover that edge in each molded product; and (e) discharging means for then discharging the molded products from the mold and allowing the molded products to cool to a solid state.

13. The apparatus of claim 12, including means for placing the preliminary shingle shape between spaced apart male and female components of a mold that together have formed interiors that define substantially the final shape of the shingle and means for bringing the said components together under sufficient compression force to shape the preliminary shingle shape into substantially the final dimensions of the shingle.

14. The apparatus of claim 12, including means for cutting peripheral material from edge portions of the shingle in the mold.

15. The apparatus of claim 14, wherein the means for cutting peripheral material comprises means for doing the cutting as part of and substantially simultaneously with the compression molding step.

16. The apparatus of claim 12, including means for cooling the mold during the compression molding step.

17. The apparatus of claim 12, including means for pushing the extrudate away from the interior of the mold.

18. The apparatus of claim 13, including means for transferring the mold to a compression molding station where the compression molding takes place.

19. The apparatus 18, wherein the means for transferring the mold includes an indexable table having a plurality of stations for molds, with means for serially transferring molds to and from the compression molding station where the compression molding takes place.

* * * * *